US012778000B2

(12) United States Patent
Pregesbauer et al.

(10) Patent No.: US 12,778,000 B2
(45) Date of Patent: Nov. 3, 2026

(54) SYSTEM AND METHOD FOR LOCATING SEEDS DEPOSITED WITHIN AN AGRICULTURAL FIELD

(71) Applicant: CNH Industrial America LLC, New Holland, PA (US)

(72) Inventors: Michael Pregesbauer, Traiskirchen (AT); Mario Rathmanner, Traiskirchen (AT); Michael Christopher Conboy, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/930,550

(22) Filed: Oct. 29, 2024

(65) Prior Publication Data

US 2026/0047514 A1 Feb. 19, 2026

Related U.S. Application Data

(60) Provisional application No. 63/684,618, filed on Aug. 19, 2024.

(51) Int. Cl.

| | |
|---|---|
| ***A01C 21/00*** | (2006.01) |
| ***A01B 63/00*** | (2006.01) |
| ***A01C 5/06*** | (2006.01) |
| ***A01C 7/00*** | (2006.01) |
| ***G01S 13/06*** | (2006.01) |
| ***G01S 13/88*** | (2006.01) |

(52) U.S. Cl.

CPC ............ *A01C 21/00* (2013.01); *A01B 63/002* (2013.01); *A01C 5/064* (2013.01); *A01C 7/00* (2013.01); *G01S 13/06* (2013.01); *G01S 13/885* (2013.01)

(58) Field of Classification Search

CPC ........... A01C 21/00; A01C 5/064; A01C 7/00; A01B 63/002; G01S 13/06; G01S 13/885

See application file for complete search history.

(56) References Cited

U.S. PATENT DOCUMENTS

| | | | | |
|---|---|---|---|---|
| 9,052,394 | B2 * | 6/2015 | Allouche | G01V 3/15 |
| 10,262,413 | B2 | 4/2019 | Strnad et al. | |
| 10,768,331 | B2 | 9/2020 | Koch et al. | |
| 10,820,488 | B2 * | 11/2020 | Schoeny | A01C 7/105 |
| 11,841,455 | B1 * | 12/2023 | Arool Emmanuel | G01S 7/4013 |

(Continued)

*Primary Examiner* — Hunter B Lonsberry
*Assistant Examiner* — Harrison Heflin
(74) *Attorney, Agent, or Firm* — Dority & Manning, P.A.

(57) ABSTRACT

A system for locating seeds deposited within a field includes a ground-engaging tool configured to engage soil. Additionally, the system includes a transceiver configured to emit output signals directed toward the soil within a portion of the field and receive echo signals indicative of a backscattering of the output signals by the soil. Each output signal has a different frequency. Furthermore, a computing system is configured to receive data from the sensor associated with the echo signals. Additionally, the computing system is configured to extract a feature associated with the echo signals from the received data. Moreover, the computing system is configured to determine the location of a seed deposited within the soil based on the extracted feature. Furthermore, the computing system is configured to control an operation associated with the ground-engaging tool based on the determined location of the seed.

19 Claims, 8 Drawing Sheets

(56) References Cited

U.S. PATENT DOCUMENTS

| | | | | |
|---|---|---|---|---|
| 12,471,517 | B2 | 11/2025 | Stanhope et al. | |
| 12,501,847 | B2 | 12/2025 | Conboy et al. | |
| 12,610,880 | B2 | 4/2026 | Conboy et al. | |
| 2010/0277397 | A1* | 11/2010 | Scott | G01D 1/00 343/904 |
| 2014/0365084 | A1* | 12/2014 | Chan | B64D 43/00 701/50 |
| 2015/0305226 | A1* | 10/2015 | Zemenchik | G01N 27/028 172/4 |
| 2018/0092294 | A1* | 4/2018 | Hubner | A01C 7/105 |
| 2023/0140374 | A1* | 5/2023 | Conboy | A01C 5/062 111/149 |
| 2024/0134007 | A1* | 4/2024 | Feng | G01S 7/412 |
| 2024/0291157 | A1* | 8/2024 | Rodriguez-Garcia | H01Q 1/48 |
| 2025/0206202 | A1* | 6/2025 | Pardina-Malbran | B60N 2/0278 |
| 2025/0331446 | A1 | 10/2025 | Conboy et al. | |

* cited by examiner

SYSTEM AND METHOD FOR LOCATING SEEDS DEPOSITED WITHIN AN AGRICULTURAL FIELD

CROSS-REFERENCE TO RELATED APPLICATIONS

This application is based upon and claims the right of priority to U.S. Provisional Patent Application No. 63/684,618, filed on Aug. 19, 2024, the disclosure of which is hereby incorporated by reference herein in its entirety for all purposes.

FIELD OF THE INVENTION

The present disclosure generally relates to systems and methods for locating objects within an agricultural field and, more particularly, to systems and methods for locating seeds deposited within an agricultural field.

BACKGROUND OF THE INVENTION

Modern farming practices strive to increase yields of agricultural fields. In this respect, seed-planting implements are towed behind a tractor or other work vehicle to disperse seed throughout a field. For example, seed-planting implements typically include one or more furrow-forming tools or openers that excavate a furrow or trench in the soil. One or more dispensing devices of the seed-planting implements may, in turn, deposit the seeds into the furrow(s). After deposition of the seeds, a furrow-closing assembly may close the furrow in the soil, such as by pushing the excavated soil into the furrow.

The locations of the seeds already deposited within the field is an important parameter when determining parameters that affect the locations of future seeds to be deposited within the field, such as the selected depth of the furrow and/or the rate at which seeds are deposited within the field. In this respect, various systems for locating seeds deposited within a field have been developed. While such systems work well, further improvements are needed.

Accordingly, an improved system and method for locating seeds deposited within a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a seed-planting implement. The seed-planting implement includes a row unit frame. Additionally, the seed-planting implement includes a ground-engaging tool supported by the row unit frame and configured to engage soil of the field during a seed planting operation. Furthermore, the seed-planting implement includes a transceiver configured to emit a plurality of output signals directed toward the soil within a portion of the field. Additionally, the transceiver is configured to receive a plurality of echo signals indicative of a backscattering of the plurality of output signals by the soil. Each output signal has a different frequency. Furthermore, the system includes a computing system communicatively coupled to the transceiver. The computing system is configured to receive data from the transceiver associated with the plurality of echo signals as the seed-planting implement travels across the field. Additionally, the computing system is configured to extract a feature associated with the plurality of echo signals from the received data. Moreover, the computing system is configured to determine a location of a seed deposited within the soil based on the extracted feature. Furthermore, the computing system is configured to control an operation of the seed-planting implement based on the determined location of the seed.

In another aspect, the present subject matter is directed to a system for locating seeds deposited within a field. The system includes a ground-engaging tool configured to engage soil of the field during a seed planting operation. Furthermore, the system includes a transceiver configured to emit a plurality of output signals directed toward the soil within a portion of the field. Additionally, the transceiver is configured to receive a plurality of echo signals indicative of a backscattering of the plurality of output signals by the soil. Each output signal has a different frequency. Moreover, the system includes a computing system communicatively coupled to the transceiver. The computing system is configured to receive data from the transceiver associated with the plurality of echo signals. Furthermore, the computing system is configured to extract a feature associated with the plurality of echo signals from the received data. Additionally, the computing system is configured to determine a location of a seed deposited within the soil based on the extracted feature. Moreover, the computing system is configured to control an operation associated with the ground-engaging tool based on the determined location of the seed.

In a further aspect, the present subject matter is directed to a method for locating seeds within a field as a seed-planting implement travels across the field. The method includes receiving, with a computing system, transceiver data associated with a plurality of echo signals as the seed-planting implement travels across the field. The plurality of echo signals are indicative of a backscattering of a plurality of output signals by soil of the field. Additionally, the method includes generating, with the computing system, a representation of the soil of the field based on the received transceiver data. Furthermore, the method includes identifying, with the computing system, a seed deposited within the soil from the generated representation. Moreover, after identifying the seed, the method includes determining, with the computing system, the location of the seed. Additionally, the method includes controlling, with the computing system, an operation of the seed-planting implement based on the determined location of the seed.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
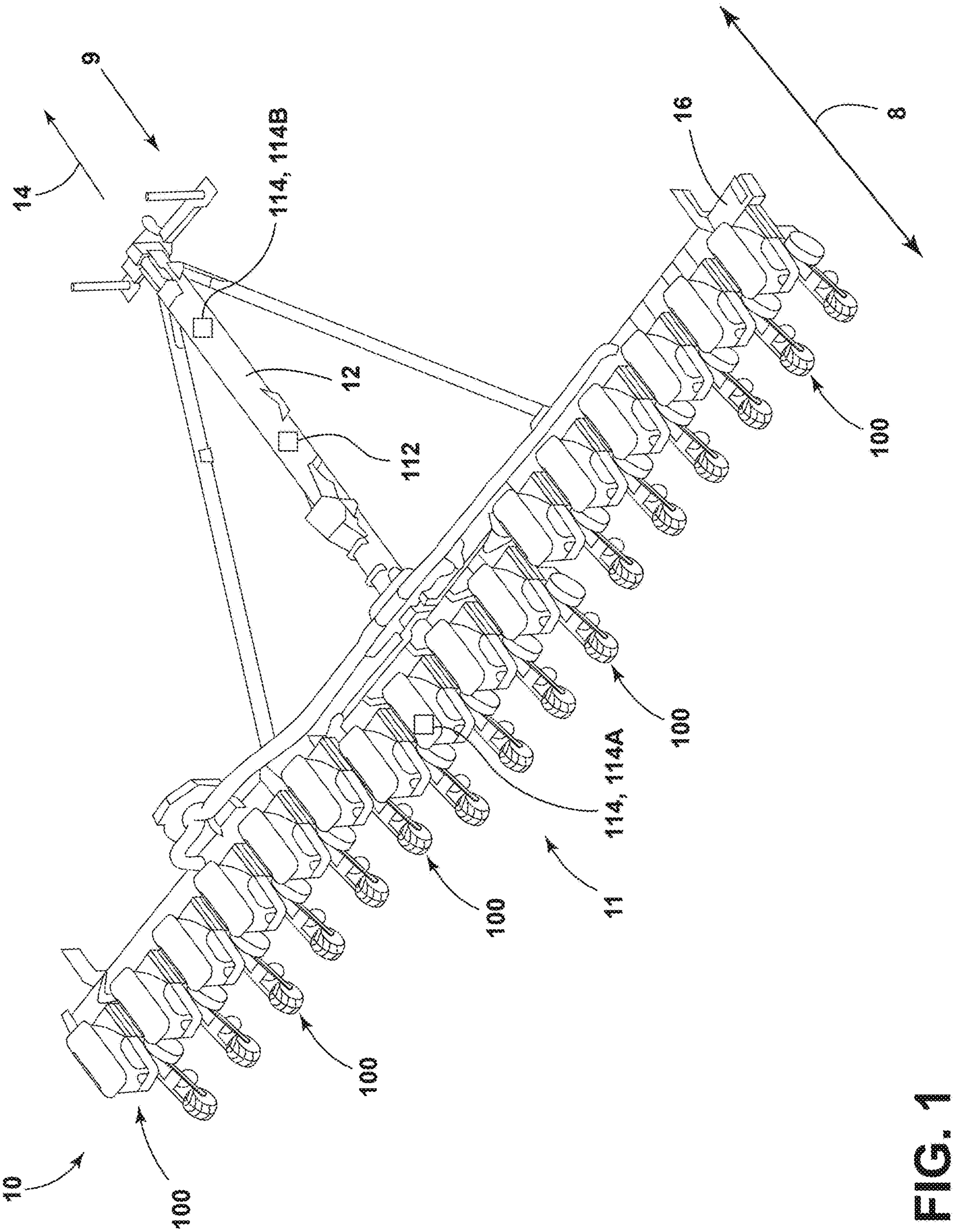
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for locating seeds deposited within an agricultural field. Specifically, in several embodiments, the disclosed systems and methods may include determining the location(s) of one or more seeds deposited within worked soil of the field based at least in part on data from a transceiver. For example, the location(s) of the seed(s) may correspond to the depth of the seed(s) below the field surface and/or the gap size or spacing between seeds.

In several embodiments, a computing system may determine the location(s) of the seed(s) deposited within the worked soil of the field based on received data from a transceiver associated with backscattering that is captured by the transceiver. Specifically, the transceiver may be in operative association with a seed-planting implement that is traveling across a field (e.g., to perform a seed planting operation thereon). In this respect, as the seed-planting implement travels across the field, the transceiver is configured to emit a plurality of output signals (e.g., microwave signals, such as ground-penetrating radar (GPR) signals) directed toward the soil within a portion of the field and receive a plurality of echo signals indicative of the backscattering of the plurality of output signals by the soil. In some embodiments, each output signal may have/be emitted at a different frequency. In this respect, in some embodiments, the computing system may extract or otherwise determine one or more features (e.g., frequency values and/or the like) associated with the plurality of echo signals from the data. Thereafter, the computing system may determine the location(s) of the seed(s) deposited within the worked soil based on the extracted feature(s). Additionally, or alternatively, in some embodiments, the computing system may generate a representation, such as a two-dimensional image, of the soil of the field from the data. Thereafter, the computing system may identify the seed deposited within the soil from the generated representation and determine the location of the seed.

Using a transceiver, the systems and methods of the present disclosure determine the location(s) of the seed(s) deposited within a field with greater accuracy. These more accurate determinations of seed location(s) enable improved and/or more precise control of the seed-planting implement based on locations(s) of the seed(s) deposited within the field, thereby leading to superior agricultural outcomes for the performed field operation(s).

Figure 2:
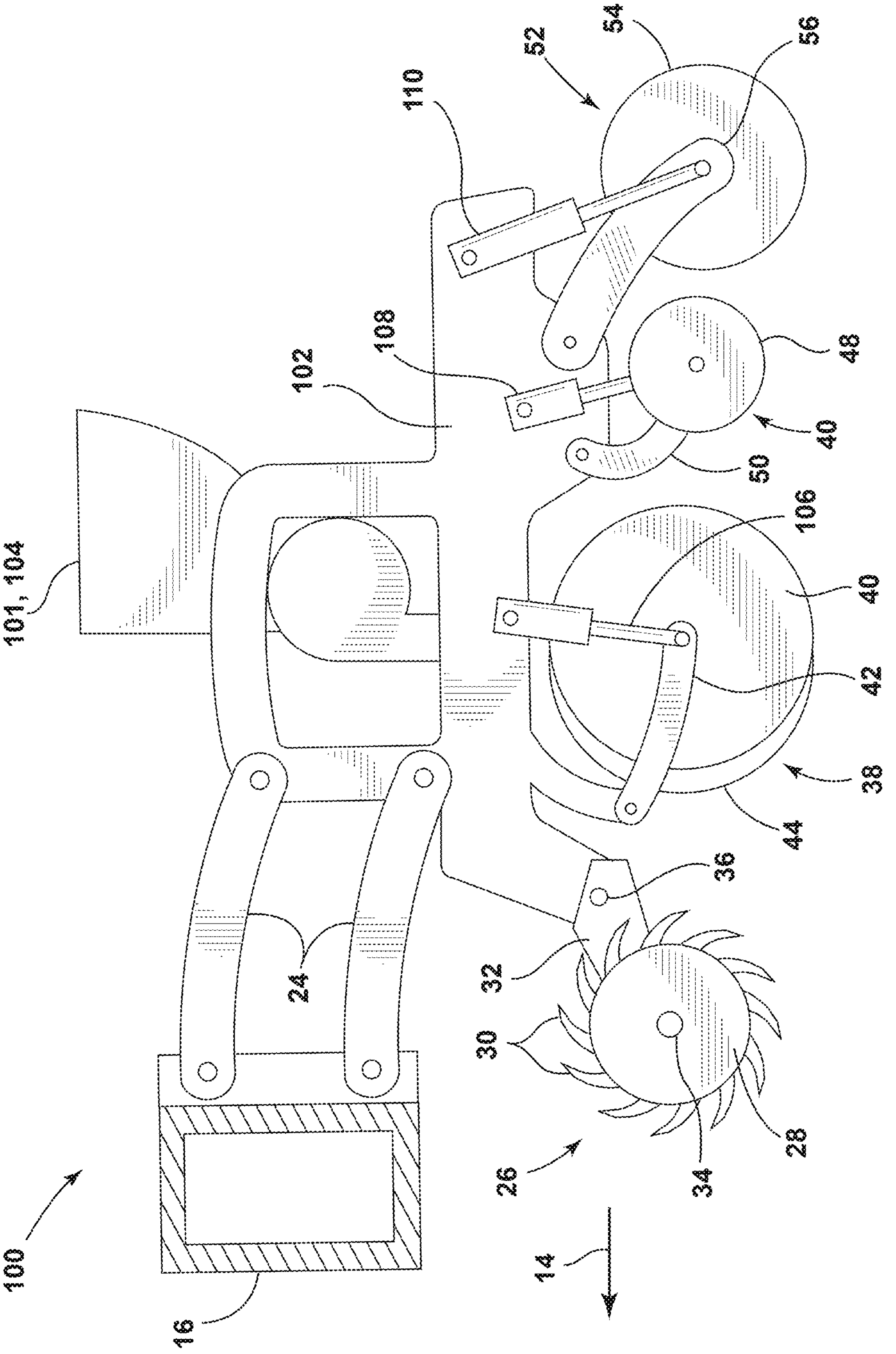
FIG. 2 illustrates a side view of one embodiment of a row unit of a seed-planting implement in accordance with aspects of the present subject matter.

Referring now to the drawings, FIG. 1 illustrates a perspective view of one embodiment of a seed-planting implement 10 and FIG. 2 illustrates a side view of one embodiment of a row unit 100 of seed-planting implement 10 in accordance with aspects of the present subject matter. As shown in FIG. 1, the seed-planting implement 10 is configured as a planter. However, in alternative embodiments, the seed-planting implement 10 may generally correspond to any suitable seed-planting equipment or implement, such as a seeder or another seed-dispensing implement.

As shown in FIG. 1, the seed-planting implement 10 extends between a forward end 9 and an aft end 11 in a longitudinal direction (indicated by arrow 8). The seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to the aft end of the tow bar 12. More specifically, the toolbar 16 is configured to support and/or couple to one or more components of the seed-planting implement 10. For example, the toolbar 16 is configured to support one or more seed-planting units or row units 100. As will be described below, each row unit 100 is configured to form a furrow having a selected depth within the soil of the field. Thereafter, each row unit 100 deposits seeds within the corresponding furrow at a selected spacing and subsequently closes the corresponding furrow after the seeds have been deposited, thereby establishing rows of planted seeds. In some embodiments, the bulk of the seeds to be planted may be stored in one or more bulk storage containers or central hoppers (not shown) supported on the toolbar 16 and/or the tow bar 12. Thus, as seeds are planted by the row units 100, a pneumatic distribution system (not shown) may distribute seeds from the central hopper(s) to the individual row units 100.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100. In addition, the lateral spacing between row units 100 may be selected based on the type of crop being planted. For example, the row units 100 may be spaced approximately thirty inches from one another for planting corn and approximately fifteen inches from one another for planting soybeans.

As shown in FIG. 2, each row unit 100 of the seed-planting implement 10 may include a row unit frame 102 adjustably coupled to the toolbar 16 by links 24. For example, one end of each link 24 may be pivotably coupled to the row unit frame 102, while an opposed end of each link 24 may be pivotably coupled to the toolbar 16. However, in alternative embodiments, the row unit 100 may be coupled to the toolbar 16 in any other suitable manner. Furthermore, one or more seed reservoirs 101, such as a primary seed hopper 104, may be coupled to or otherwise supported on the row unit frame 102 and configured to store seeds (e.g., that are received from a bulk storage containers or filled individually).

Additionally, the row unit 100 includes one or more ground-engaging tools configured to prepare and/or finish the soil during a seed planting operation. For example, as shown in FIG. 2, the row unit 100 includes a residue removal device 26 pivotably coupled to the row unit frame 102 at its forward end relative to the direction of travel 14. In general, the residue removal device 26 may be configured to break up and/or sweep away or otherwise remove residue, dirt clods, and/or the like from the path of the row unit 100. As such, in several embodiments, the residue removal device 26 may include a pair of wheels 28 (one is shown), with each wheel 28 having a plurality of tillage points or fingers 30. As such, the wheels 28 may be configured to roll relative to the soil as the seed-planting implement 10 travels across the field such that the fingers 30 break up and/or sweep away residue and dirt clods. Additionally, the residue removal device 26 may include a support arm 32 that adjustably couples the wheels 28 to the row unit frame 102. For example, one end of the support arm 32 may be pivotably coupled to the wheels 28 via an axle 34, while an opposed end of the support arm 32 may be pivotably coupled to the row unit frame 102 via a pivot joint 36. However, in alternative embodiments, the residue removal device 26 may have any other suitable configuration. For example, in one embodiment, the residue removal device 26 may include only a single wheel 28.

Furthermore, the ground-engaging tool(s) of the row unit 100 may include one or more ground-engaging tools positioned aft of the residue removal device 26 relative to the direction of travel 14. As such, the ground-engaging tool(s) may be configured to interact with soil at a location(s) aft of the residue removal device 26. In this respect, and as will be described below, the ground-engaging tool(s) may facilitate the formation and subsequent closing of a furrow or trench within the soil into which seeds are deposited.

In several embodiments, the ground-engaging tool(s) may include an opening assembly 38 supported on the row unit frame 102. In general, the opening assembly 38 may be configured to form the furrow or trench within the soil. More specifically, in some embodiments, the opening assembly 38 may include a gauge wheel 40 adjustably coupled to the row unit frame 102 via a support arm 42. Furthermore, the opening assembly 38 may also include one or more opener disks 44 configured to excavate a furrow or trench within the soil. Thus, as the seed-planting implement 10 travels across the field, the gauge wheel 40 may be configured to engage the top surface of the soil. In this respect, the position of the gauge wheel 40 relative to the row unit frame 102 may set the penetration of the opener disk(s) 44 (and, thus, the depth of the furrow being excavated).

Moreover, in several embodiments, the ground-engaging tool(s) may include a closing assembly 46 supported on the row unit frame 102. In general, the closing assembly 46 may be configured to close the furrow or trench within the soil by the opening assembly 38. Specifically, in some embodiments, the closing assembly 46 may include a pair of closing disks 48 (one is shown) adjustably coupled to the row unit frame 102 via a support arm 50. In this respect, the closing disks 48 may be positioned relative to each other such that soil flows between the disks 48 as the seed-planting implement 10 travels across the field. As such, the closing disks 48 may be configured to collapse or otherwise close the furrow after seeds have been deposited therein, such as by pushing the excavated soil into the furrow. However, in alternative embodiments, the closing assembly 46 may have any other suitable configuration. For example, in one embodiment, the closing assembly 46 may have closing wheels (not shown) in lieu of the closing disks 48.

Furthermore, in several embodiments, the ground-engaging tool(s) may include a press wheel assembly 52 supported on the row unit frame 102. Specifically, in some embodiments, the press wheel assembly 52 may include a press wheel 54 adjustably coupled to the row unit frame 102 via a support arm 56. In this respect, as the seed-planting implement 10 travels across the field, the press wheel 54 may roll over the closed furrow to firm the soil over the seed and promote favorable seed-to-soil contact. However, in alternative embodiments, the press wheel assembly 52 may have any other suitable configuration.

Additionally, in alternative embodiments, the row unit 100 may include any other suitable ground-engaging tools in addition to or in lieu of the opening assembly 38, the closing assembly 46, and the press wheel assembly 52. Moreover, in some embodiments, the row unit 100 may include only the opening assembly 38 and the closing assembly 46.

As shown, the row unit 100 may include one or more actuators configured to adjust one or more operating parameters of the ground-engaging tool(s). For example, the actuator(s) may be configured to adjust the position of the ground-engaging tool(s) relative to the row unit frame 102 and/or the force being applied to the ground-engaging tool(s). As such, the actuator(s) may correspond to any suitable type of actuator(s), such as a fluid-driven actuator(s) (e.g., a pneumatic cylinder(s)).

In the illustrated embodiment, the row unit 100 includes an opening assembly actuator 106, a closing assembly actuator 108, and a press wheel assembly actuator 110. In this respect, the opening assembly actuator 106 may be configured to adjust one or more operating parameters of the gauge wheel 40, such as the force being applied to the gauge wheel 40 and/or the position of the gauge wheel 40 relative to the row unit frame 102 (which, in turn, adjust the penetration depth of the opener disk(s) 44). Moreover, the closing assembly actuator 108 may be configured to adjust one or more operating parameters of the closing disks 48, such as the force being applied to and/or the position relative to the row unit frame 102 (which may, in turn, adjust the penetration depth) of the closing disks 48. Additionally, the press wheel assembly actuator 110 may be configured to adjust one or more operating parameters of the press wheel 54, such as the force being applied to the press wheel 54. However, in alternative embodiments, the row unit 100 may include any other suitable actuator(s) and/or the actuator(s) may be configured to adjust any other suitable operating parameters of the ground-engaging tool(s).

Moreover, a location sensor 112 may be provided in operative association with the seed-planting implement 10. For instance, as shown in FIGS. 1 and 2, the location sensor 112 is installed on or within the seed-planting implement 10, such as on the toolbar 16. In general, the location sensor 112 may be configured to determine the current location of the seed-planting implement 10 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 112 may be transmitted to a computing system of the seed-planting implement 10 (e.g., in the form coordinates) and stored within the computing system's memory for subsequent processing and/or analysis. For instance, based on the known dimensional configuration and/or relative positioning between the seed-planting implement 10 and the vehicle towing the seed-planting implement 10, the determined location from the location sensor 112 may be used to geo-locate the seed-planting implement 10 within the field.

The configuration of the seed-planting implement 10 described above and shown in FIGS. 1 and 2 is provided only to place the present subject matter in an exemplary field of use. Thus, the present subject matter may be readily adaptable to any manner of seed-planting implement configuration.

Additionally, one or more transceivers 114 may be provided in operative association with the seed-planting implement 10. In general, the transceiver(s) 114 is configured to emit a plurality of output signals directed toward the soil within a portion of the field across which the seed-planting implement 10 is traveling. The output signals are, in turn, backscattered or otherwise reflected by the soil as a plurality of echo signals. In this respect, the transceiver(s) 114 receives the echo signals, which are indicative of a backscattering of the output signals by the soil. As will be described below, one or more characteristics of the received echo signals may be indicative of the location(s) of the seed(s) within the worked soil, such as the depth(s) of the seed(s) below the field surface and/or spacing or gap size(s) between deposited seeds.

In some embodiments, the transceiver(s) 114 may be a microwave signal-based sensor such that the output signals may correspond to microwave signals, such as a ground-penetrating radar (GPR) sensor(s). For example, the transceiver(s) 114 may be configured as a continuous wave (CW) radar(s), such as a stepped frequency continuous wave (SFCW) radar(s). Furthermore, the transceiver(s) 114 may include one or more antennas (not shown). The antenna(s) may be configured to receive the echo signals. For example, the antenna(s) may be configured as a Vivaldi antenna(s) or taper-slot antenna(s), which is configured to receive echo signals across a range of frequencies, such as an ultra-wideband frequency range.

In some embodiments, the transceiver(s) 114 may emit each output signal at a different frequency of a plurality of frequencies. In other words, the transceiver(s) 114 may emit the plurality of output signals across a range of frequencies, such as a frequency range between and inclusive of 1200 megahertz through 2900 megahertz. However, it should be appreciated that the frequency range may correspond to any other suitable frequency range, such as 500 megahertz through 3000 megahertz or 2000 megahertz through 2500 megahertz.

In some embodiments, the transceiver 114 be configured to emit the plurality of output signals as a single or continuous wave. The continuous wave may correspond to a non-pulsatile wave, such as a wave that does not have periodic discontinuity(ies) in the wave/gaps between consecutive waves. In this respect, the transceiver(s) 114 may continuously emit the plurality of output signals across the range of frequencies, such as the range of frequencies described above, without pulsing. Such continuous emittance of the plurality of output signals across the range of frequencies provides more accurate locating of the seed(s) deposited within the field.

Moreover, the transceiver(s) 114 may be installed or otherwise supported on the seed-planting implement 10. The transceiver(s) 114 may be installed or other supported on the seed-planting implement 10 such that the plurality of output signals emitted by the transceiver(s) 114 may be directed toward a portion of the field adjacent to the seed-planting implement 10. For example, as illustrated in FIG. 2, a first transceiver 114A is mounted on the aft end 11 of the seed-planting implement 10, such as behind the press wheel(s) 54. In this respect, the first transceiver 114A is configured to emit a first plurality of output signals directed toward the portion of the field aft of the tools of the seed-planting implement 10 relative to the direction of travel 14 as the seed-planting implement 10 is moved across the field. The soil in the portion of the field aft of the tools of the seed-planting implement 10 may be soil that has been worked by the seed-planting implement 10. The worked soil includes the seed(s) deposited within the field. Furthermore, the first transceiver 114A may be "aircoupled" or positioned above the soil of the field. In this respect, the first transceiver 114A is configured to output signals and receive echo signals without physically contacting the field.

Additionally, as illustrated in FIG. 2, in some embodiments, a second transceiver 114B may optionally be installed or otherwise supported on the seed-planting implement 10. For example, the second transceiver 114B may be mounted on the forward end 9 of the seed-planting implement 10, such as on the toolbar 16. In this respect, the second transceiver 114B is configured to emit a second plurality of output signals directed toward the portion of the field forward of the tools of the seed-planting implement 10 relative to the direction of travel 14 as the seed-planting implement 10 is moved across the field. The soil in the portion of the field forward of the tools of the seed-planting implement 10 may be undisturbed or unworked soil. However, in alternative embodiments, the transceiver(s) 114 may be mounted at any other suitable location(s) on the seed-planting implement 10. Furthermore, the seed-planting implement 10 may include any suitable number of transceivers, such as a single transceiver or two or more transceivers. Furthermore, the second transceiver 114B may be "aircoupled" or positioned above the soil of the field. In this respect, the second transceiver 114B is configured to output signals and receive echo signals without physically contacting the field.

In some embodiments, the seed-planting implement 10 may include one or more transceiver actuators 116 configured to adjust one or more operating parameters of the transceiver(s) 114. As shown in FIG. 2, the seed-planting implement 10 may include a first transceiver actuator 116A configured to adjust one or more operating parameters of the first transceiver 114A. Likewise, the seed-planting implement 10 may include a second transceiver actuator 116B configured to adjust one or more operating parameters of the second transceiver 114B. For example, the transceiver actuator(s) 116 may be configured to adjust the position of the transceiver(s) 114 relative to the toolbar 16 and/or relative to each other. As such, the transceiver actuator(s) 116 may correspond to any suitable type of actuator(s), such as a fluid-driven actuator(s) (e.g., a pneumatic cylinder(s)).

Moreover, one or more displacement sensors 118 may be provided in operative association with the seed-planting implement 10. In general, the displacement sensor(s) 118 is configured to generate data indicative of a displacement of the seed-planting implement 10, such as the toolbar 16 of the seed-planting implement 10, as the seed-planting implement 10 travels across the field. As will be described below, the data generated by the displacement sensor(s) 118 is, in turn, subsequently used to control the positions of the first and second transceivers 114A, 114B.

In general, the displacement sensor(s) 118 may correspond to any suitable sensing device(s) configured to generate data indicative of the displacement of the seed-planting implement 10, such as the displacement of the toolbar 16. For example, the displacement sensor(s) 118 may correspond to an imaging device(s) such as a camera(s), a proximity sensor(s), and/or the like.

Furthermore, any number of displacement sensor(s) 118 may be positioned on and/or supported by the seed-planting implement 10 and configured to generate data indicative of the displacement if the seed-planting implement 10. For example, in the embodiment shown in FIG. 2, a single displacement sensor 118 is positioned on the toolbar 16 of the seed-planting implement 10. However, it should be appreciated that the displacement sensor(s) 118 may be positioned at any other suitable location for generating data indicative of the displacement of the seed-planting implement 10.

Figure 3:
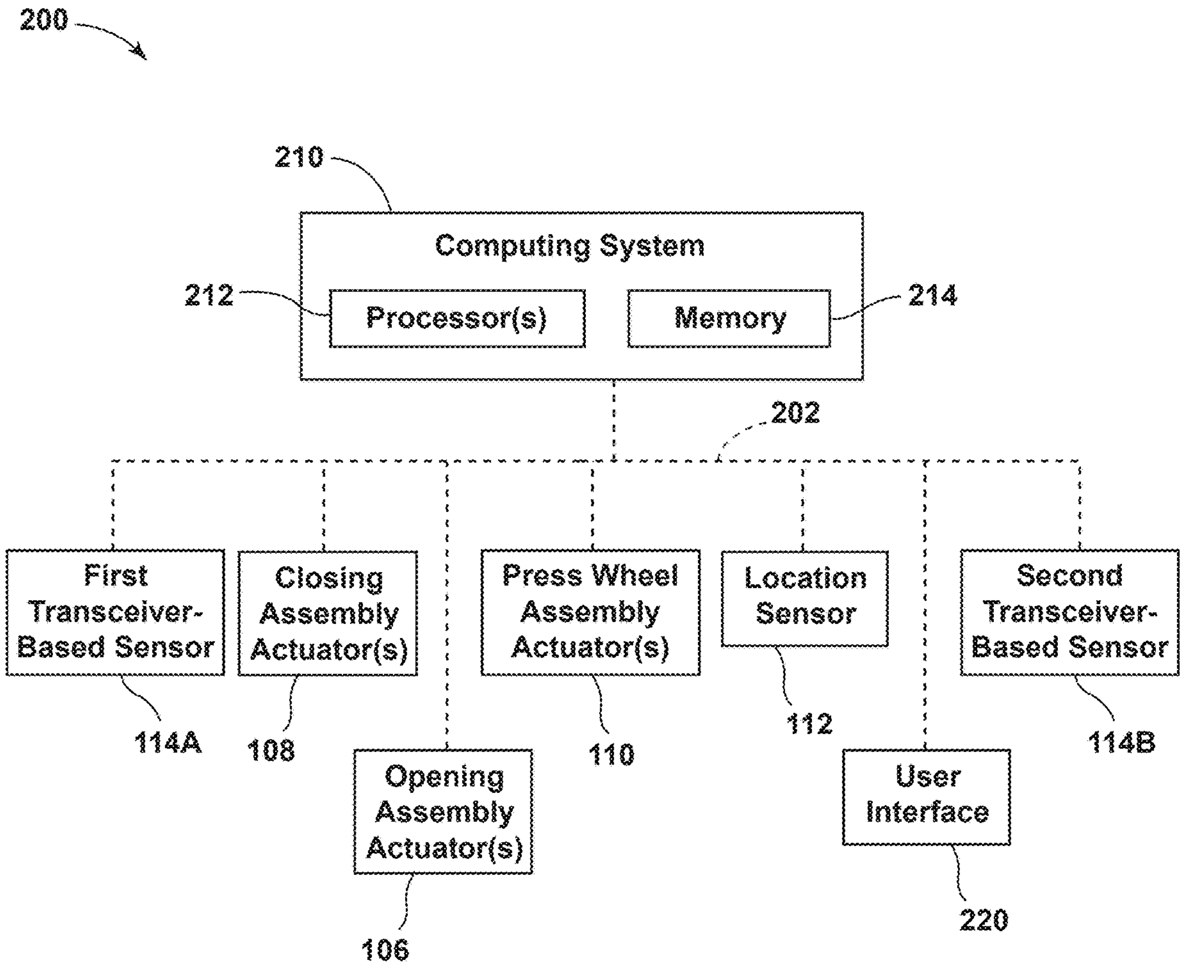
FIG. 3 illustrates a schematic view of one embodiment of a system for locating seeds deposited within a field in accordance with aspects of the present subject matter.

Referring now to FIG. 3, a schematic view of one embodiment of a system 200 for locating seeds deposited within a field is illustrated in accordance with aspects of the present subject matter. In general, the system 200 will be described herein with reference to the seed-planting implement 10 described above with reference to FIGS. 1 and 2. However, it should be appreciated by those of ordinary skill in the art that the disclosed system 200 may generally be utilized with agricultural implements having any other suitable implement configuration.

In accordance with aspects of the present subject matter, the system 200 may include a computing system 210 communicatively coupled to one or more components of the seed-planting implement 10 and/or the system 200 to allow the operation of such components to be electronically or automatically controlled by the computing system 210. For instance, the computing system 210 may be communicatively coupled to the location sensor 112 via a communicative link 202. As such, the computing system 210 may be configured to receive location data from the location sensor 112 that is indicative of the location of the seed-planting implement 10 within the field. Furthermore, the computing system 210 may be communicatively coupled to the first transceiver 114A via the communicative link 202. As such, the computing system 210 may be configured to receive data from the first transceiver 114A as the seed-planting implement 10 travels across the field. Additionally, the computing system 210 may be communicatively coupled to the second transceiver 114B via the communicative link 202. As such, the computing system 210 may be configured to receive data from the second transceiver 114B as the seed-planting implement 10 travels across the field. Moreover, the computing system 210 may be communicatively coupled to the opening assembly actuator(s) 106 via the communicative link 202. In this respect, the computing system 210 may be configured to control the operation of the opening assembly actuator(s) 106 in a manner that controls adjustment of one or more operating parameters of the opening assembly(ies) 38, such as the force being applied to the opener disk(s) 44, the soil penetration depth of the opener disk(s) 44, and/or the like. Furthermore, the computing system 210 may be communicatively coupled to the displacement sensor(s) 118 via the communicative link 202. As such, the computing system 210 may be configured to receive data from the displacement sensor(s) 118 as the seed-planting implement 10 travels across the field. Moreover, the computing system 210 may be communicatively coupled to the first transceiver actuator 116A and the second transceiver actuator 116B via the communicative link 202. In this respect, the computing system 210 may be configured to control the operation of the first transceiver actuator 116A and/or the second transceiver actuator 116B in a manner that controls adjustment of one or more operating parameters of the first transceiver 114A and/or the second transceiver 114B, such as the position(s) of one or both. Additionally, the computing system 210 may be communicatively coupled to any other suitable components of the seed-planting implement 10 and/or the system 200.

In general, the computing system 210 may comprise any suitable processor-based device known in the art, such as a given controller or computing device or any suitable combination of controllers or computing devices. Thus, in several embodiments, the computing system 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

It should be appreciated that the computing system 210 may correspond to an existing computing system(s) of the seed-planting implement 10 and/or the work vehicle (not shown), itself, or the computing system 210 may correspond to a separate processing device. For instance, in one embodiment, the computing system 210 may form all or part of a separate plug-in module that may be installed in association with the seed-planting implement 10 and/or work vehicle to allow for the disclosed systems to be implemented without requiring additional software to be uploaded onto existing control devices of the seed-planting implement 10 and/or work vehicle.

Furthermore, it should also be appreciated that the functions of the computing system 210 may be performed by a single processor-based device or may be distributed across any number of processor-based devices, in which instance such devices may be considered to form part of the computing system 210. For instance, the functions of the computing system 210 may be distributed across multiple application-specific controllers or computing devices, such as a navigation controller, an engine computing controller, a transmission controller, an implement controller and/or the like.

Additionally, the system 200 may include a user interface 220. More specifically, the user interface 220 may be configured to provide feedback from the computing system 210 (e.g., feedback associated with the location(s) of seed(s) deposited within the field) to the operator. As such, the user interface 220 may include one or more feedback devices (not shown), such as display screens, speakers, warning lights, and/or the like, which are configured to provide feedback from the computing system 210 to the operator. As such, the user interface 220 may, in turn, be communicatively coupled to the computing system 210 via the communicative link 202 to permit the feedback to be transmitted from the computing system 210 to the user interface 220. Furthermore, some embodiments of the user interface 220 may include one or more input devices, such as touchscreens, keypads, touchpads, knobs, buttons, sliders, switches, mice, microphones, and/or the like, which are configured to receive inputs from the operator. In one embodiment, the user interface 220 may be mounted or otherwise positioned within the work vehicle towing the seed-planting implement 10. However, in alternative embodiments, the user interface 220 may be mounted at any other suitable location.

Figure 4:
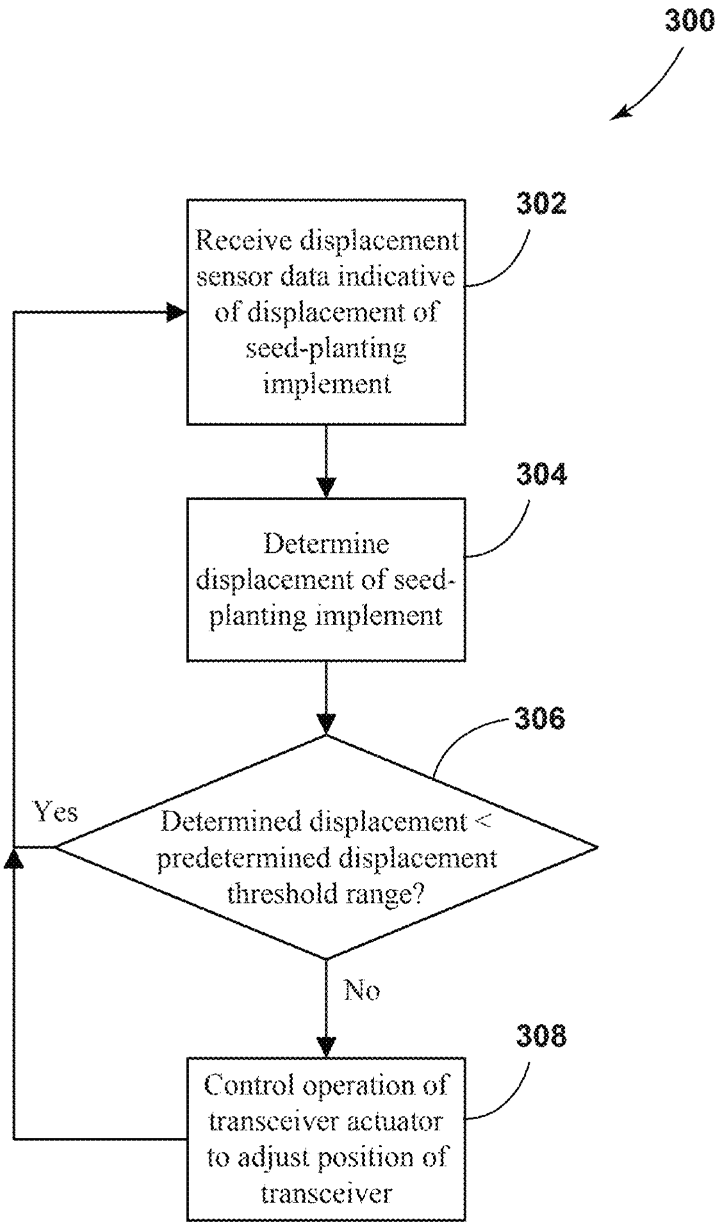
FIG. 4 illustrates a flow diagram providing one embodiment of example control logic for controlling the operation of a seed-planting implement in accordance with aspects of the present subject matter.

Referring now to FIG. 4, a flow diagram of one embodiment of example control logic 300 that may be executed by the computing system 210 (or any other suitable computing system) for controlling the operation of a seed-planting implement is illustrated in accordance with aspects of the present subject matter. Specifically, the control logic 300 shown in FIG. 4 is representative of steps of one embodiment of an algorithm that can be executed to adjust the relative position of transceivers of the seed-planting implement based on displacement of the seed-planting implement (e.g., vehicle frame), thereby improving the quality data received by the transceivers and, thus, improving the quality of a seed planting operation. Thus, in several embodiments, the control logic 300 may be advantageously utilized in association with a system installed on or forming part of a seed-planting implement to allow for real-time control of the implement without requiring substantial computing resources and/or processing time. However, in other embodiments, the control logic 300 may be used in association with any other suitable system, application, and/or the like for controlling the operation of a seed-planting implement.

As shown in FIG. 4, at (302), the control logic 300 includes receiving displacement sensor data indicative of a displacement of a seed-planting implement as the seed-planting implement travels across a field. Specifically, the computing system 210 may be communicatively coupled to the displacement sensor(s) 118 via the communicative link 202. In this respect, as the seed-planting implement 10 travels across a field (e.g., to perform a seed planting operation thereon), the computing system 210 is configured to receive data from the displacement sensor(s) 118 that is indicative of the displacement of the seed-planting implement 10, such as the displacement of the toolbar 16 of the seed-planting implement 10.

Additionally, at (304), the control logic 300 includes determining the displacement of the seed-planting implement. Specifically, the computing system 210 may be configured to determine the displacement of the seed-planting implement 10 based on the displacement sensor data received at (302). For example, in some embodiments, the computing system 210 may access a look-up table(s) stored within its memory device(s) 214 that correlates the displacement sensor data received at (302) to displacement value(s). Additionally, the displacement may correspond to a vertical displacement of toolbar 16 of seed-planting implement 10, such as bouncing of toolbar 16 due to rough or rocky terrain, as the seed-planting implement 10 travels across the field. However, it should be appreciated that the displacement may correspond to any suitable type of displacement, such as horizontal displacement.

Furthermore, at (306), the control logic 300 includes comparing the determined displacement of the seed-planting implement to a predetermined displacement threshold range. Specifically, in several embodiments, the computing system 210 is configured to compare the displacement of the seed-planting implement 10 determined at (304) to the predetermined displacement threshold range. The predetermined displacement threshold range may correspond to a displacement threshold range selected by an operator of the seed-planting implement 10 or selected by the computing system 210. Additionally, the displacement threshold range may correspond to a displacement threshold range equal to or above which may cause excessive movement/displacement of the first transceiver 114A and/or the second transceiver 114B and/or may cause excessive misalignment, such as horizontal misalignment, of the first transceiver 114A with the second transceiver 114B.

In some embodiments, when the displacement of the seed-planting implement 10 determined at (304) falls within or exceeds the predetermined displacement threshold range, it is likely that the first transceiver 114A and/or the second transceiver 114B has been excessively displaced and/or the first transceiver 114A and the second transceiver have become misaligned with each other. In this respect, the position of the first transceiver 114A and/or the second transceiver 114B is adjusted, such as to account for the change in displacement of the transceivers 114A, 114B and/or the misalignment of transceivers 114A, 114B. As such, the control logic 300 proceeds to (308).

Additionally, or alternatively, in some embodiments, when the displacement of the seed-planting implement 10 determined at (304) falls below the predetermined displacement threshold range, it is likely that the first transceiver 114A and the second transceiver 114B have not been excessively displaced and have not become misaligned with each other. As such, the control logic 300 returns to (302).

Moreover, as shown in FIG. 4, at (308), the control logic 300 includes controlling an operation of a transceiver actuator to adjust the position of the transceiver. Specifically, in several embodiments, the computing system 210 may be communicatively coupled to the first transceiver actuator 116A and/or the second transceiver actuator 116B via the communicative link 202. As such, the computing system 210 may be configured to control the operation of the first transceiver actuator 116A and/or the second transceiver actuator 116B to adjust the position of the first transceiver 114A and/or the second transceiver 114B. Thereafter, the control logic 300 returns to (302).

Figure 5:
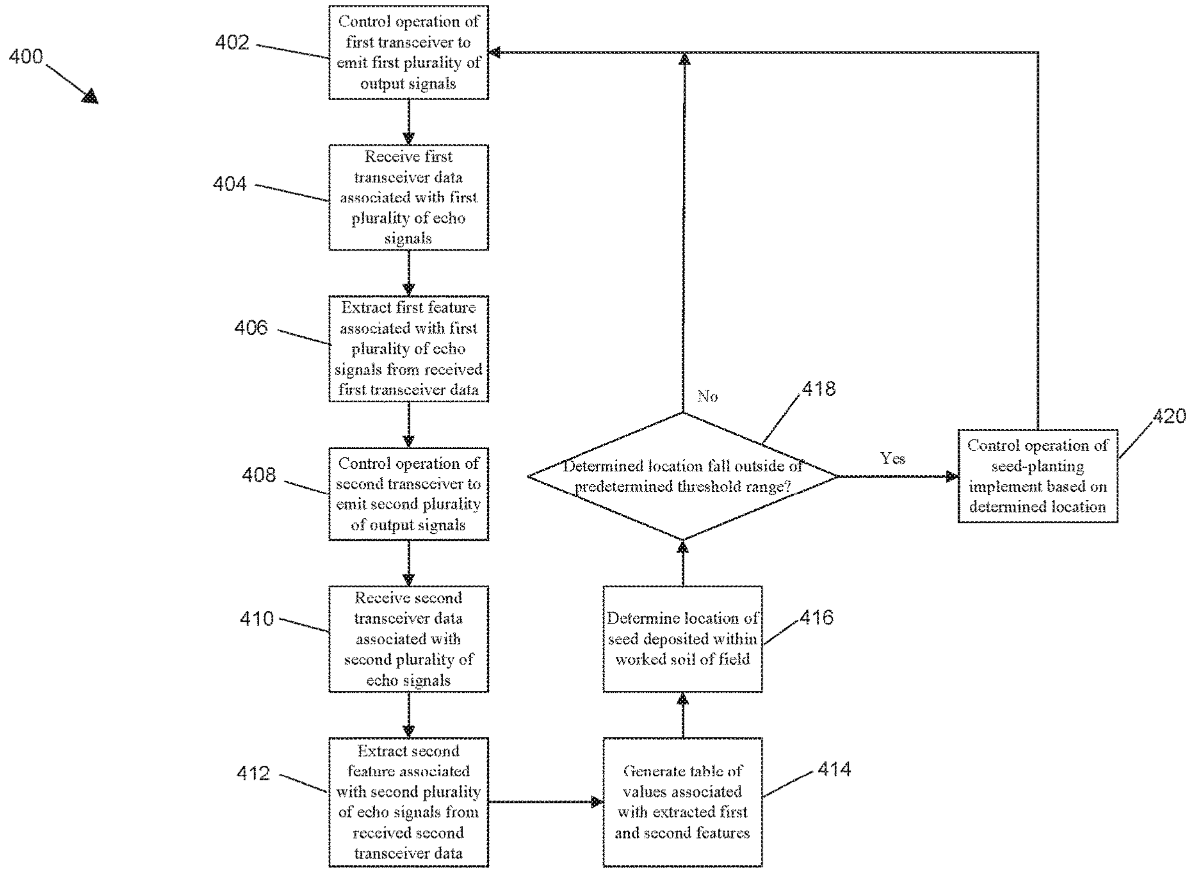
FIG. 5 illustrates a flow diagram providing a first embodiment of example control logic for locating seeds deposited within a field in accordance with aspects of the present subject matter.

Referring now to FIG. 5, a flow diagram of a first embodiment of example control logic 400 that may be executed by the computing system 210 (or any other suitable computing system) for locating seeds deposited within a field is illustrated in accordance with aspects of the present subject matter. Specifically, the control logic 400 shown in FIG. 5 is representative of steps of one embodiment of an algorithm that can be executed to accurately determine the location(s) of seed(s) deposited within the field, thereby improving the quality of a seed planting operation. Thus, in several embodiments, the control logic 400 may be advantageously utilized in association with a system installed on or forming part of a seed-planting implement to allow for real-time control of the implement without requiring substantial computing resources and/or processing time. However, in other embodiments, the control logic 400 may be used in association with any other suitable system, application, and/or the like for locating seeds deposited within a field.

As shown in FIG. 5, at (402), the control logic 400 includes controlling the operation of a first transceiver to emit a plurality of output signals. As described above, the seed-planting implement 10 may include a first transceiver 114A configured to emit a first plurality of output signals directed toward the soil within a portion of a field. Each output signal has/is emitted at a different frequency of a plurality of frequencies. The first transceiver 114A may be positioned to emit the first plurality of output signals directed toward the soil within the portion of the field aft of the tools of the seed-planting implement 10, which may be worked soil of the field.

Moreover, at (404), the control logic 400 includes receiving data from the first transceiver associated with a plurality of echo signals as the seed-planting implement travels across the field. The worked soil backscatters or otherwise reflects the first plurality of output signals emitted by the first transceiver 114A as a first plurality of echo signals. The one or more seeds deposited within the worked soil affect the characteristics of the first plurality of echo signals. As such, the first transceiver 114A is configured to receive the plurality of backscattered first plurality of echo signals. Furthermore, the computing system 210 may be communicatively coupled to the first transceiver 114A via the communicative link 202. In this respect, as the seed-planting implement 10 travels across a field (e.g., to perform a seed planting operation thereon), the computing system 210 is configured to receive data from the first transceiver 114A that is indicative of the received first plurality of echo signals.

Additionally, at (406), the control logic 400 includes extracting a first feature associated with the first plurality of echo signals from the received first transceiver data. In general, the first feature extracted from the first transceiver data may be associated with the first plurality of echo signals received by the first transceiver 114A. Specifically, in several embodiments, the computing system 210 may be configured to analyze the received first transceiver data to extract the first feature associated with the first plurality of echo signals. The first feature, in turn, be affected by the seed(s) deposited within the worked soil and, thus, be used to determine the location(s) of the seed(s) deposited within the field. For example, the first feature may include the size (e.g., the amplitude) of the echo signal(s), the shape of the echo signal(s), the frequency value of the echo signal(s), the frequency shift of the echo signal(s), one or more spectral components of the echo signal(s), the inverse wavelet transformation coefficient of the echo signal(s), and/or the like. As such, the computing system 210 may use a suitable algorithm(s) to extract the first feature from the first transceiver data.

Moreover, at (408), the control logic 400 includes controlling the operation of a second transceiver to emit a plurality of output signals. As described above, the seed-planting implement 10 may include a second transceiver 114B configured to emit a plurality of output signals directed toward the soil within a portion of a field. Each output signal has/is emitted at a different frequency of a plurality of frequencies. The second transceiver 114B may be positioned to emit the plurality of output signals directed toward the soil within the portion of the field forward of the tools of the seed-planting implement 10, which may be undisturbed or unworked soil of the field.

Furthermore, at (410), the control logic 400 includes receiving data from the second transceiver associated with a plurality of echo signals as the seed-planting implement travels across the field. The unworked soil backscatters or otherwise reflects the plurality of output signals as a plurality of echo signals. The unworked soil affects the characteristics of the echo signals. As such, the second transceiver 114B is configured to receive the plurality of backscattered echo signals. Furthermore, the computing system 210 may be communicatively coupled to the second transceiver 114B via the communicative link 202. In this respect, as the seed-planting implement 10 travels across a field (e.g., to perform a seed planting operation thereon), the computing system 210 is configured to receive data from the second transceiver 114B that is indicative of the received plurality of echo signals. As will be described below, the received second transceiver data is generally used with the first transceiver data to determine the location(s) of the seed(s) deposited within the field.

Moreover, as shown in FIG. 5, at (412), the control logic 400 includes extracting a second feature associated with the second plurality of echo signals from the received second transceiver data. In general, the second feature extracted from the second transceiver data may be associated with the second plurality of echo signals received by the second transceiver 114B. Specifically, in several embodiments, the computing system 210 may be configured to analyze the received second transceiver data to extract the second feature associated with the second plurality of echo signals. The second feature may, in turn, be affected by the lack of seeds deposited within the unworked soil and, thus, be used to determine the location(s) of the seed(s) deposited within the field. For example, the second feature may include the size (e.g., the amplitude) of the echo signal(s), the shape of the echo signal(s), the frequency value of the echo signal(s), the frequency shift of the echo signal(s), one or more spectral components of the echo signal(s), the inverse wavelet transformation coefficient of the echo signal(s), and/or the like, which may differ from the first feature extracted at (406). As such, the computing system 210 may use a suitable algorithm(s) to extract the second feature from the second transceiver data.

Additionally, at (414), the control logic 400 includes generating a table of values associated with the extracted first feature and the extracted second feature. More specifically, the computing system 210 may generate a table of values, such as a matrix of values, associated with the first feature extracted at (406) and the second feature extracted at (408). For example, the table of values may be number values associated with the size (e.g., the amplitude) of the echo signal(s), the shape of the echo signal(s), the frequency value of the echo signal(s), the frequency shift of the echo signal(s), one or more spectral components of the echo signal(s), the inverse wavelet transformation coefficient of the echo signal(s), and/or the like.

Furthermore, at (416), the control logic 400 includes determining the location of the seed deposited within the worked soil based on the generated table of values. Specifically, the computing system 210 may determine the location(s) of the seed(s) deposited within the worked soil based on the table of values generated at (406). In some embodiments, the computing system 210 may determine a depth of the seed(s) below a field surface of the field. Additionally, or alternatively, in some embodiments, the computing system 210 may determine a spacing or gap size between the seed and other seeds deposited within the worked soil.

Additionally, at (418), the control logic 400 includes comparing the determined location of the seed deposited within the worked soil to a predetermined seed location threshold range. More specifically, the computing system 210 may compare the determined location of the seed (e.g., the location of the seed determined at (416)) to the predetermined seed location threshold range. The predetermined seed location threshold range may correspond to range of selected seed depth values at which the seeds are to be deposited below the soil surface, a range of selected seed spacing values at which seeds deposited within the field are to be spaced apart from each other, and/or the like. In this respect, when the determined location of the seed deposited within the worked soil falls outside of the predetermined seed locations threshold range, the computing system 210 may control the operation of a seed-planting implement. As such, the control logic 400 may proceed to (420). Conversely, when the determined location of the seed deposited within the worked soil equals or falls within the predetermined seed locations threshold range, the control logic 400 returns to (402).

Moreover, at (420), the control logic 400 includes controlling the operation of the seed-planting implement. Specifically, the computing system 210 may control the operation of the seed-planting implement. For example, as described above, in some embodiments, the computing system 210 may be communicatively coupled to the opening assembly actuator(s) 106 via the communicative link 202. In this respect, the computing system 210 may be configured to control the operation of the opening assembly actuator(s) 106 in a manner that controls adjustment of one or more operating parameters of the opening assembly(ies) 38. For example, the computing system 210 may be configured to adjust the force being applied to the opener disk(s) 44, adjust the penetration depth of the opener disk(s) 44, and/or the like. Thereafter, the control logic 400 returns to (402).

Figure 6:
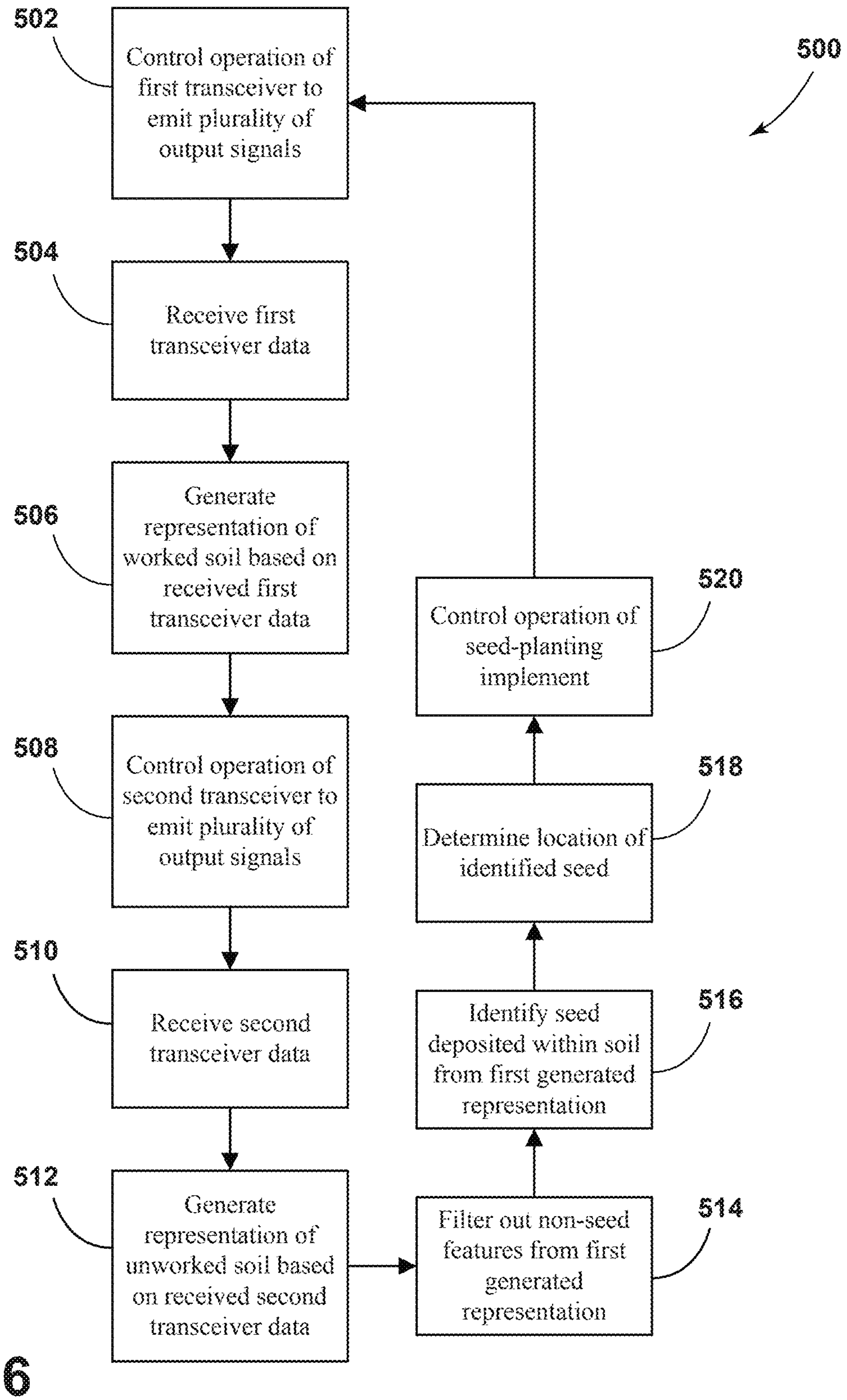
FIG. 6 illustrates a flow diagram providing a second embodiment of example control logic for locating seeds deposited within a field in accordance with aspects of the present subject matter.

Referring now to FIG. 6, a flow diagram of a second embodiment of example control logic 500 that may be executed by the computing system 210 (or any other suitable computing system) for locating seeds deposited within a field is illustrated in accordance with aspects of the present subject matter. Specifically, the control logic 500 shown in FIG. 6 is representative of steps of one embodiment of an algorithm that can be executed to accurately determine the location(s) of seed(s) deposited within the field, thereby improving the quality of a seed planting operation. Thus, in several embodiments, the control logic 500 may be advantageously utilized in association with a system installed on or forming part of a seed-planting implement to allow for real-time control of the implement without requiring substantial computing resources and/or processing time. However, in other embodiments, the control logic 500 may be used in association with any other suitable system, application, and/or the like for locating seeds deposited within a field.

As shown in FIG. 6, at (502), the control logic 500 includes controlling the operation of a first transceiver to emit a plurality of output signals. As described above, the seed-planting implement 10 may include the first transceiver 114A configured to emit the first plurality of output signals directed toward the soil within the portion of the field. Each output signal has/is emitted at the different frequency of the plurality of frequencies. The first transceiver 114A may be positioned to emit the first plurality of output signals directed toward the soil within the portion of the field aft of the tools of the seed-planting implement 10, which may be worked soil of the field.

In some optional embodiments, prior to (502) and (508), the control logic 500 may include determining that a seed-planting implement is performing a seed-planting operation. For example, the computing system 210 may be configured to determine that the seed-planting implement 10 is dispensing/depositing the seeds within the field, such as via a CAN bus signal. Thereafter, the computing system 210 may proceed to (502) and to (508). In this respect, the data received by the computing system 210 may be filtered in that the computing system 210 only receives data from the first transceiver 114A and the second transceiver 114B once the computing system 210 determines that the seed-planting operation is being performed.

Moreover, at (504), the control logic 500 includes receiving data from the first transceiver associated with a plurality of echo signals as the seed-planting implement travels across the field. The worked soil backscatters or otherwise reflects the first plurality of output signals emitted by the first transceiver 114A as the first plurality of echo signals. The one or more seeds deposited within the worked soil affect the characteristics of the first plurality of echo signals. As such, the first transceiver 114A is configured to receive the plurality of backscattered first plurality of echo signals. Furthermore, the computing system 210 may be communicatively coupled to the first transceiver 114A via the communicative link 202. In this respect, as the seed-planting implement 10 travels across a field (e.g., to perform a seed planting operation thereon), the computing system 210 is configured to receive data from the first transceiver 114A that is indicative of the received first plurality of echo signals.

Additionally, at (506), the control logic 500 includes generating a representation of the worked soil of the field based on the received first transceiver data. Specifically, in several embodiments, the computing system 210 may be configured to analyze/process the received first transceiver data (e.g., the data received at (504)) to generate a representation of the worked soil within the field. As such, the computing system 210 may include a suitable algorithm(s) stored within its memory device(s) 214 that, when executed by the processor(s) 212, generates the representation from the data received from the first transceiver 114A.

The representation of the worked soil within the field may correspond to any suitable data structure that depicts or otherwise provides an indication of the worked soil based on the received first transceiver data. For example, in some embodiments, the representation of the worked soil may correspond to a two-dimensional image(s) illustrating or depicting the worked soil. However, in alternative embodiments, the representation of the worked soil may correspond to any other suitable type of data structure, such as one-dimensional representation or dataset.

Moreover, at (508), the control logic 500 includes controlling the operation of a second transceiver to emit a plurality of output signals. As described above, the seed-planting implement 10 may include a second transceiver 114B configured to emit a plurality of output signals directed toward the soil within a portion of a field. Each output signal has/is emitted at a different frequency of a plurality of frequencies. The second transceiver 114B may be positioned to emit the plurality of output signals directed toward the soil within the portion of the field forward of the tools of the seed-planting implement 10, which may be undisturbed or unworked soil of the field.

Furthermore, at (510), the control logic 500 includes receiving data from the second transceiver associated with a plurality of echo signals as the seed-planting implement travels across the field. The unworked soil backscatters or otherwise reflects the plurality of output signals as a plurality of echo signals. The unworked soil affects the characteristics of the echo signals. As such, the second transceiver 114B is configured to receive the plurality of backscattered echo signals. Furthermore, the computing system 210 may be communicatively coupled to the second transceiver 114B via the communicative link 202. In this respect, as the seed-planting implement 10 travels across a field (e.g., to perform a seed planting operation thereon), the computing system 210 is configured to receive data from the second transceiver 114B that is indicative of the received plurality of echo signals. As will be described below, the received second transceiver data is generally used with the first transceiver data to determine the location(s) of the seed(s) deposited within the field.

Moreover, as shown in FIG. 6, at (512), the control logic 500 includes generating a representation of the unworked soil of the field based on the received second transceiver data. Specifically, in several embodiments, the computing system 210 may be configured to analyze/process the received second transceiver data (e.g., the data received at (510)) to generate a representation of the unworked soil within the field. As such, the computing system 210 may include a suitable algorithm(s) stored within its memory device(s) 214 that, when executed by the processor(s) 212, generates the representation from the data received from the second transceiver 114B.

The representation of the unworked soil within the field may correspond to any suitable data structure that depicts or otherwise provides an indication of the unworked soil based on the received first transceiver data. For example, in some embodiments, the representation of the unworked soil may correspond to a two-dimensional image(s) illustrating or depicting the unworked soil. However, in alternative embodiments, the representation of the unworked soil may correspond to any other suitable type of data structure, such as one-dimensional representation or dataset.

Additionally, at (514), the control logic 500 includes filtering out non-seed features from the first generated representation based on a comparison of the first generated representation to the second generated representation. Specifically, in several embodiments, the computing system 210 may be configured to compare the first representation, the representation of the worked soil, generated at (506) to the second representation, the representation of the unworked soil, generated at (512). The computing system 210 may be configured to analyze/process the comparison of the first and second generated representations to filter out non-seed features, or features of the soil that are not indicative of seeds, from the first generated representation. For example, in some embodiments, the computing system 210 may be configured to subtract or otherwise distinguish the differences between two-dimensional images of the worked soil and the unworked soil to filter out non-seed features, such as rocks, soil clumps, and/or the like, from the two-dimensional image of the worked soil, or the first generated representation. In this respect, as will be described below, after the computing system 210 has filtered out the non-seed features, the computing system 210 may be configured to identify the seed(s) deposited within the soil from the first generated representation.

Furthermore, at (516), the control logic 500 includes identifying the seed deposited within the soil from the first generated representation. Specifically, in several embodiments, after the computing system 210 has filtered out the non-seed features from the first generated representation at (514), the computing system 210 may may be configured to identify that an object(s) within the first generated representation is the seed(s) deposited within the soil. In this respect, as will be described below, after the seed(s) has been identified in the first generated representation, the computing system 210 may be configured to determine a location of the seed(s).

Moreover, at (518), the control logic 500 includes determining a location of the seed. Specifically, in several embodiments, after the computing system 210 has identified that the object(s) within the first generated representation is the seed(s) deposited within the soil, the computing system 210 may be configured to determine the location(s) of the seed(s). In some embodiments, the computing system 210 may determine a depth of the seed(s) below a field surface of the field. Additionally, or alternatively, in some embodiments, the computing system 210 may determine a spacing or gap size between the seed and other seeds deposited within the soil.

Additionally, as shown in FIG. 6, at (520), the control logic 500 includes controlling the operation of the seed-planting implement. Specifically, the computing system 210 may control the operation of the seed-planting implement. For example, as described above, in some embodiments, the computing system 210 may be communicatively coupled to the opening assembly actuator(s) 106 via the communicative link 202. In this respect, the computing system 210 may be configured to control the operation of the opening assembly actuator(s) 106 in a manner that controls adjustment of one or more operating parameters of the opening assembly(ies) 38. For example, the computing system 210 may be configured to adjust the force being applied to the opener disk(s) 44, adjust the penetration depth of the opener disk(s) 44, and/or the like. Thereafter, the control logic 500 returns to (502).

Figure 7:
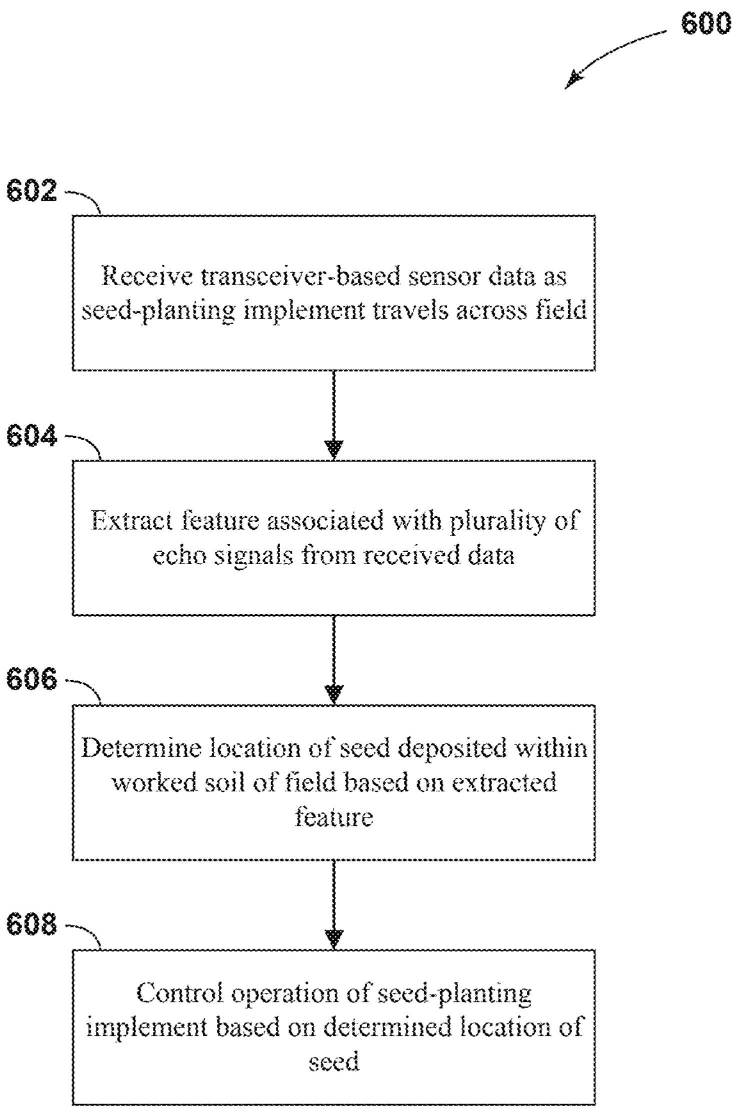
FIG. 7 illustrates a flow diagram of a first embodiment of a method for locating seeds deposited within a field in accordance with aspects of the present subject matter.

Referring now to FIG. 7, a flow diagram of a first embodiment of a method 600 for locating seeds deposited within a field is illustrated in accordance with aspects of the present subject matter. In general, the method 600 will be described herein with reference to the seed-planting implement 10 and the system 200 described above with reference to FIGS. 1-6. However, it should be appreciated by those of ordinary skill in the art that the disclosed method 600 may generally be implemented with any agricultural implement having any suitable implement configuration and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (602), the method 600 may include receiving, with a computing system, transceiver data associated with a plurality of echo signals as the seed-planting implement travels across the field, the plurality of echo signals indicative of a backscattering of a plurality of output signals by soil of the field. For instance, as described above, the computing system 210 may receive data from the transceiver(s) 114 of the seed-planting implement 10 associated with the plurality of echo signals as the seed-planting implement 10 travels across a field to perform a seed planting operation. Such transceiver data may, in turn, be used to extract a feature associated with the plurality of echo signals.

Additionally, at (604), the method 600 may include extracting, with the computing system, a feature associated with the plurality of echo signals from the received data. For instance, as described above, the computing system 210 may be configured to extract the feature associated with the plurality of echo signals from the received transceiver data.

Moreover, at (606), the method 600 may include determining, with the computing system, a location of a seed deposited within the soil based on the extracted feature. For instance, as described above, the computing system 210 may be configured to determine the location(s) of the seed(s) deposited within the worked soil of the field based on the extracted feature.

Furthermore, at (608), the method 600 may include controlling, with the computing system, an operation of the seed-planting implement based on the determined location of the seed. For instance, as described above, the computing system 210 may be configured to control the operation of the seed-planting implement 10 based on the determined location(s) of the seed(s).

Figure 8:
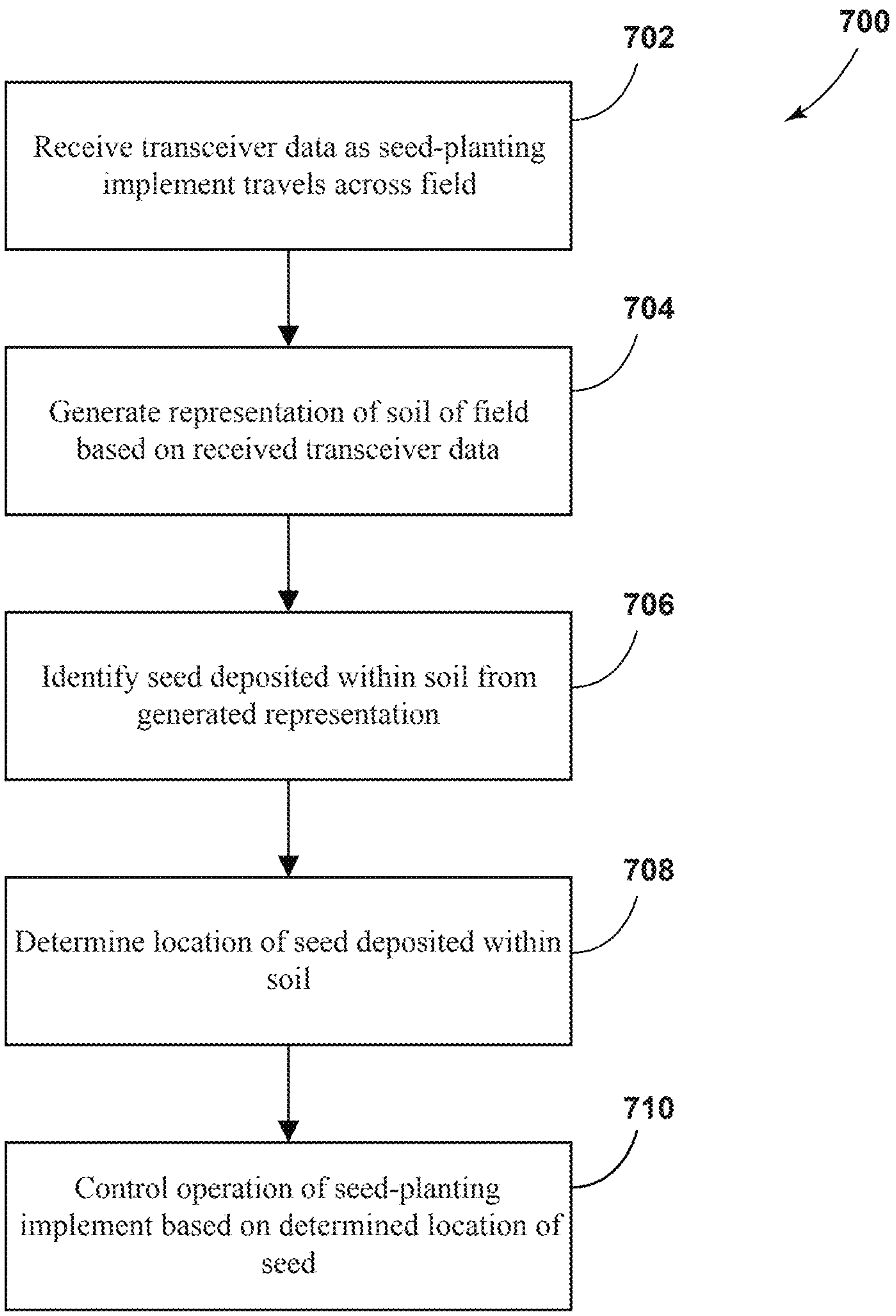
FIG. 8 illustrates a flow diagram of a second embodiment of a method for locating seeds deposited within a field in accordance with aspects of the present subject matter.

Referring now to FIG. 8, a flow diagram of a second embodiment of a method 700 for locating seeds deposited within a field is illustrated in accordance with aspects of the present subject matter. In general, the method 700 will be described herein with reference to the seed-planting implement 10 and the system 200 described above with reference to FIGS. 1-6. However, it should be appreciated by those of ordinary skill in the art that the disclosed method 700 may generally be implemented with any agricultural implement having any suitable implement configuration and/or within any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (702), the method 700 may include receiving, with a computing system, transceiver data associated with a plurality of echo signals as the seed-planting implement travels across the field, the plurality of echo signals indicative of a backscattering of a plurality of output signals by soil of the field. For instance, as described above, the computing system 210 may receive data from the transceiver(s) 114 of the seed-planting implement 10 associated with the plurality of echo signals as the seed-planting implement 10 travels across a field to perform a seed planting operation. Such transceiver data may, in turn, be used to generate a representation of the soil of the field.

Additionally, at (704), the method 700 may include generating, with the computing system, a representation of the soil of the field based on the received transceiver data. For instance, as described above, the computing system 210 may be configured to generate the representation of the soil of the field based on the received transceiver data.

Moreover, at (706), the method 700 may include identifying, with the computing system, a seed deposited within the soil from the generated representation. For instance, as described above, the computing system 210 may be configured to identify the seed deposited within the soil from the generated representation.

Furthermore, at (708), the method 700 may include determining, with the computing system, a location of the seed after identifying the seed. For instance, as described above, the computing system 210 may be configured to determine the location of the seed after the seed has been identified.

Additionally, at (710), the method 700 may include controlling, with the computing system, an operation of the seed-planting implement based on the determined location of the seed. For instance, as described above, the computing system 210 may be configured to control the operation of the seed-planting implement 10 based on the determined location(s) of the seed(s).

It is to be understood that the steps of the control logic 300, the control logic 400, the control logic 500, the method 600, and the method 700 are performed by the computing system 210 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 210 described herein, such as the control logic 300, the control logic 400, the control logic 500, the method 600, and the method 700, is implemented in software code or instructions which are tangibly stored on a tangible computer readable medium. The computing system 210 loads the software code or instructions via a direct interface with the computer readable medium or via a wired and/or wireless network. Upon loading and executing such software code or instructions by the computing system 210, the computing system 210 may perform any of the functionality of the computing system 210 described herein, including any steps of the control logic 300, the control logic 400, the control logic 500, the method 600, and the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A seed-planting implement, comprising:

a row unit frame;

an opening assembly supported by the row unit frame, the opening assembly configured to engage soil of the field to form a furrow within the soil during a seed planting operation;

a first transceiver configured to emit a first plurality of output signals directed toward soil worked by the opening assembly within a portion of the field and receive a first plurality of echo signals indicative of a backscattering of the first plurality of output signals by the soil worked by the opening assembly;

a second transceiver configured to emit a second plurality of output signals directed toward soil unworked by the opening assembly within a portion of the field and receive a second plurality of echo signals indicative of a backscattering of the second plurality of output signals by the soil unworked by the opening assembly; and a computing system communicatively coupled to the first and second transceivers, the computing system configured to:

receive data from the first transceiver that is associated with the first plurality of echo signals as the seed-planting implement travels across the field;

extract a first feature associated with the first plurality of echo signals and, thus, the soil worked by the opening assembly, from the received data from the first transceiver;

receive data from the second transceiver that is associated with the second plurality of echo signals as the seed-planting implement travels across the field;

extract a second feature associated with the second plurality of echo signals and, thus, the soil unworked by the opening assembly, from the received data from the second transceiver;

determine a location of a seed deposited within the soil based on the extracted first and second features; and control an operation of the seed-planting implement based on the determined location of the seed.

2. The seed-planting implement of claim 1, wherein the first and second transceivers are each configured to emit the plurality of output signals as non-pulsatile microwaves.

3. The seed-planting implement of claim 1, wherein the first and second transceivers are each configured as a non-contact-based ground-penetrating radar sensing device, the non-contact-based ground-penetrating radar sensing device positioned above the soil.

4. The seed-planting implement of claim 3, wherein the non-contact-based ground-penetrating radar sensing device is configured as a stepped frequency continuous wave radar sensing device.

5. A system for locating seeds deposited within a field, the system comprising:

an opening assembly configured to engage soil of the field to form a furrow within the soil during a seed planting operation;

a first transceiver configured to emit a first plurality of output signals directed toward soil worked by the opening assembly within a portion of the field and receive a first plurality of echo signals indicative of a backscattering of the first plurality of output signals by the soil worked by the opening assembly; and a second transceiver configured to emit a second plurality of output signals directed toward soil unworked by the opening assembly within a portion of the field and receive a second plurality of echo signals indicative of a backscattering of the second plurality of output signals by the soil unworked by the opening assembly; and a computing system communicatively coupled to the first and second transceivers, the computing system configured to:

receive data from the first transceiver that is associated with the first plurality of echo signals;

extract a first feature associated with the first plurality of echo signals and, thus, the soil worked by the opening assembly, from the received data from the first transceiver;

receive data from the second transceiver that is associated with the second plurality of echo signals;

extract a second feature associated with the second plurality of echo signals and, thus, the soil unworked by the opening assembly, from the received data from the second transceiver;

determine a location of a seed deposited within the soil based on the extracted first and second features; and control an operation associated with the opening assembly based on the determined location of the seed.

6. The system of claim 5, wherein, when determining the location of the seed, the computing system is configured to:

determine a depth of the seed below a field surface of the field.

7. The system of claim 5, wherein:

the seed deposited within the soil is one of a plurality of seeds deposited within the soil; and when determining the location of the seed, the computing system is configured to:

determine a gap size between the seed and the plurality of seeds deposited within the soil.

8. The system of claim 5, wherein, when determining the location of the seed deposited within the soil, the computing system is configured to:

compare the extracted first feature to the extracted second feature; and determine the location of the seed from the extracted first feature when the extracted first feature differs from the extracted second feature.

9. The system of claim 5, wherein:

when extracting the first feature, the computing system is configured to extract a first plurality of echo signal frequency values associated with the first plurality of echo signals; and when extracting the second feature, the computing system is configured to extract a second plurality of echo signal frequency values associated with the second plurality of echo signals.

10. The system of claim 5, wherein the computing system is further configured to generate a field map identifying the location of the seed within the field.

11. The system of claim 5, wherein the first and second transceivers are each configured to emit the plurality of output signals as continuous, non-pulsatile, microwaves.

12. The system of claim 5, wherein the first and second transceivers are installed on a seed-planting implement configured to perform a seed planting operation on the field.

13. The system of claim 5, wherein the first and second transceivers are each configured as a non-contact-based ground-penetrating radar sensing device, the non-contact-based ground-penetrating radar device positioned above the soil.

14. The system of claim 13, wherein the non-contact-based ground-penetrating radar sensing device is configured as a stepped frequency continuous wave radar sensing device.

15. The system of claim 5, wherein the first and second transceivers each comprise a Vivaldi antenna configured to receive the plurality of echo signals.

16. The system of claim 5, wherein:

each output signal of the first plurality of output signals has a different frequency than the other output signals of the first plurality of output signals; and each output signal of the second plurality of output signals has a different frequency than the other output signals of the second plurality of output signals.

17. A method for locating seeds deposited within a field as a seed-planting implement travels across the field, the method comprising:

receiving, with a computing system, first transceiver data associated with a first plurality of echo signals as the seed-planting implement travels across the field, the first plurality of echo signals indicative of a backscattering of a first plurality of output signals by soil of the field worked by an opening assembly of the seed-planting implement;

generating, with the computing system, a first representation of the soil of the field worked by the opening assembly based on the received first transceiver data;

receiving, with the computing system, second transceiver data associated with a second plurality of echo signals as the seed-planting implement travels across the field, the second plurality of echo signals indicative of a backscattering of a second plurality of output signals by soil of the field unworked by the opening assembly of the seed-planting implement;

generating, with the computing system, a second representation of the soil of the field unworked by the opening assembly based on the received second transceiver data;

identifying, with the computing system, a seed deposited within the soil from the first generated representation based on the first generated representation and the second generated representation;

after identifying the seed, determining, with the computing system, a location of the seed; and controlling, with the computing system, an operation of the seed-planting implement based on the determined location of the seed.

18. The method of claim 17, wherein identifying the seed deposited within the soil comprises:

filtering out, with the computing system, non-seed features from the first generated representation based on a comparison of the first generated representation to the second generated representation; and after filtering out the non-seed features from the first generated representation, identifying, with the computing system, the seed deposited within the soil from the first generated representation.

19. The method of claim 17, wherein:

generating the first representation of the soil of the field worked by the opening assembly comprises generating, with the computing system, a first image of the soil of the field worked by the opening assembly based on the received first transceiver data; and generating the second representation of the soil of the field unworked by the opening assembly comprises generating, with the computing system, a second image of the soil of the field unworked by the opening assembly based on the received second transceiver data.

* * * * *